March 11, 1924.　　　　　　　　　　　　1,486,758
A. E. JERRAM
LAWN MOWER
Filed Aug. 16, 1920　　　　3 Sheets-Sheet 1

Inventor
A. E. Jerram
by Wilkinson & Giusta
Attorneys.

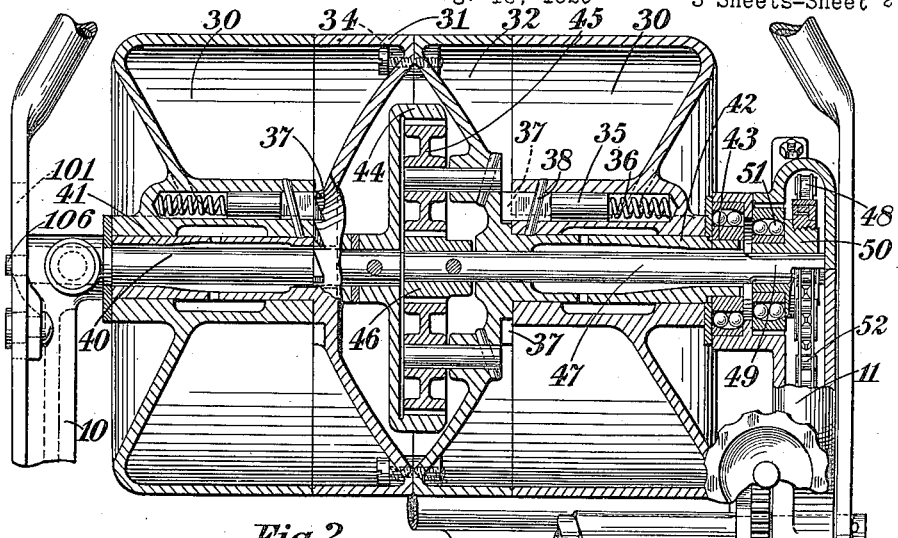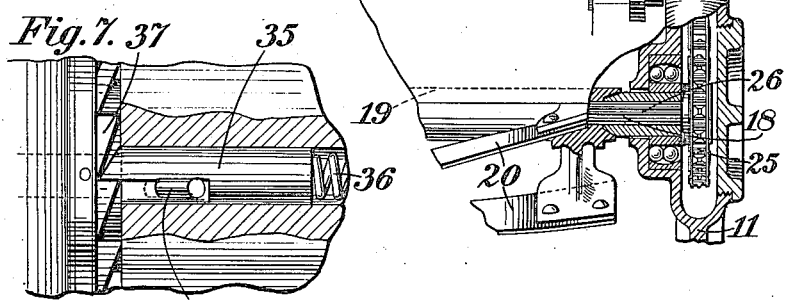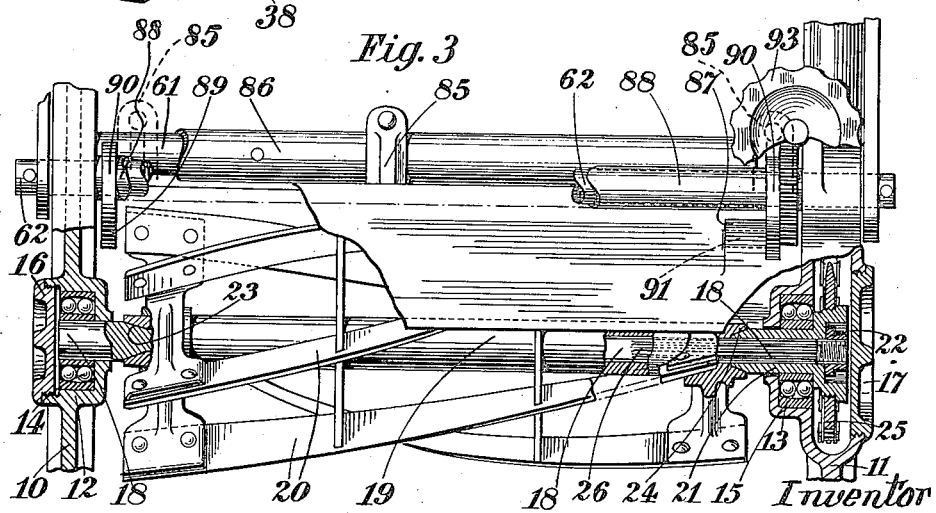

March 11, 1924.
A. E. JERRAM
LAWN MOWER
Filed Aug. 16, 1920
1,486,758
3 Sheets-Sheet 3
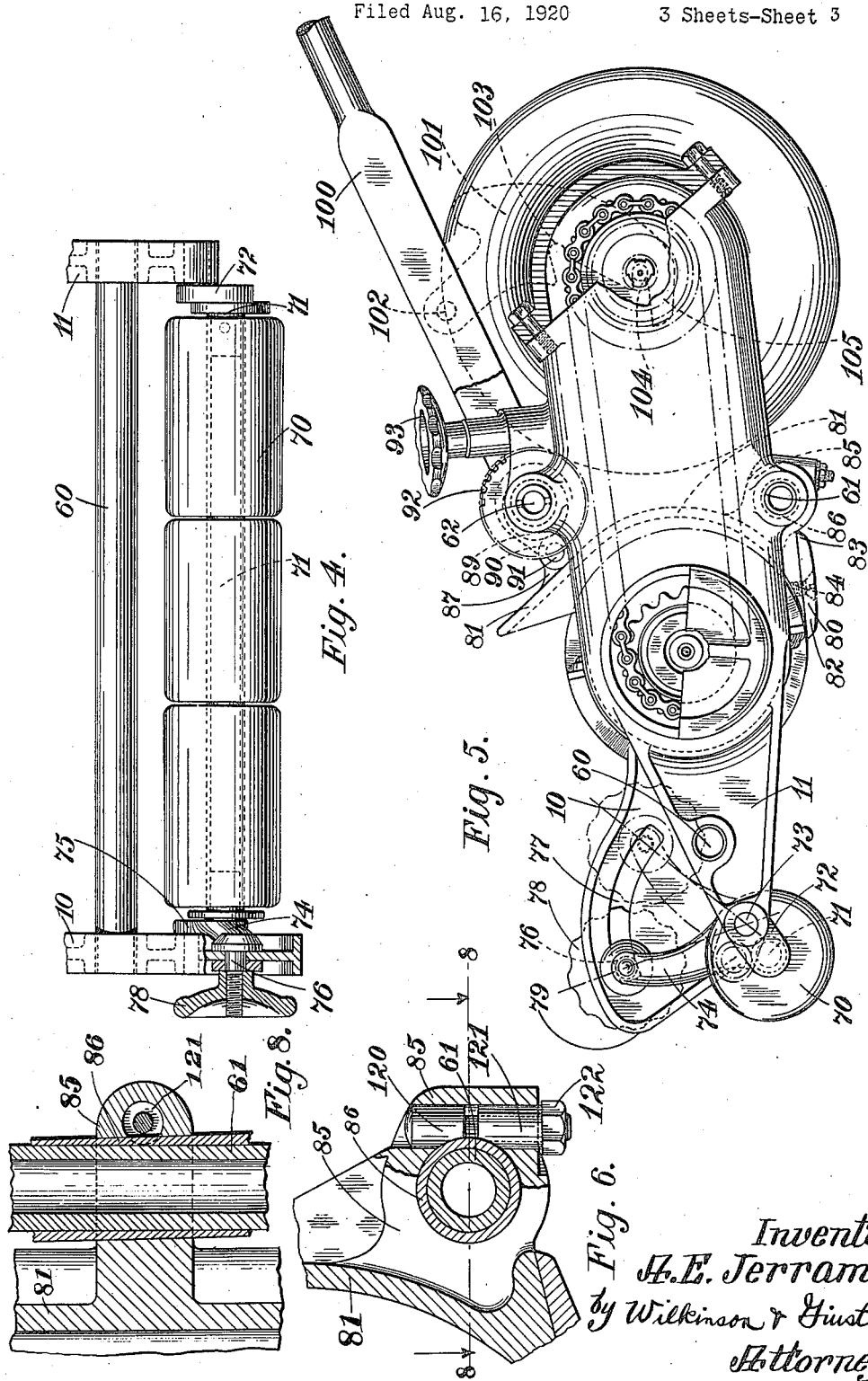
Inventor
A. E. Jerram
by Wilkinson & Giusta
Attorneys Patented Mar. 11, 1924.

1,486,758

UNITED STATES PATENT OFFICE.

ARTHUR ERNEST JERRAM, OF LEICESTER, ENGLAND.

LAWN MOWER.

Application filed August 16, 1920. Serial No. 403,899.

*To all whom it may concern:*

Be it known that I, ARTHUR ERNEST JERRAM, a subject of the King of England, residing at Leicester, England, have invented certain new and useful Improvements in Lawn Mowers, of which the following is a specification.

This invention is for improvements in or relating to lawn-mowers, and has for its object to provide a compact machine of this type, which is of greater mechanical efficiency and more readily adjusted by unskilled labour than those hitherto produced and is less likely to suffer derangement through the rough usage to which this class of machine is usually subjected; in addition, the rotary cutters can be removed for regrinding without upsetting those adjustments of the machine which are necessary to maintain it in satisfactory working order.

The invention therefore consists in the hereinafter described improvements or modifications in machines of the type comprising front and rear rollers (or wheels), whereof the rear are driving-rollers, a rotary cylindric cutter or cutting reel driven from these rear rollers and co-operating with a fixed knife, or ledger blade, and an adjustment preferably of the front roller, whereby the level of the fixed knife with respect to the ground can be regulated.

According to this invention, there is provided in a lawn-mower the combination with a rotary cutting reel having a central hub of two separate rotatable coaxial elements engaging the ends of the hub and supporting it coaxially with them, one of said elements being movable endwise with respect to the other and means are also provided for locking it against such movement.

Preferably the hub of the cutter is hollow and one of the said rotatable elements is a spindle mounted in a bearing at one end and extending through the hollow hub; a shoulder on the spindle near its bearing and facing the other end of the spindle engages one end of the hub of the cutter and the other end is engaged by a shoulder or seating on the end of a bush which is also threaded on to the spindle, the bush and the spindle being secured together by a nut secured on the end of the spindle and seating on that end of the bush which is remote from the bearing for the spindle.

According to another feature of the invention there is provided in a lawn-mower, the combination with a revolving cutter, a driving roller therefor and a transmission gear (e. g. a chain gear) operatively connected to each of them, of a multiplying gear interposed between the said gear and one of the elements, for example the driving roller, whereto it is operatively connected.

Preferably the gear which appropriated to the rotary cylindric cutter is of a diameter approximating to half the diameter of the cylindric cutter or over, and is actuated by a gear-wheel of about the same diameter, which second gear wheel is driven by a separate multiplying gear having a ratio of 4 to 1 or more.

According to yet another feature of the invention, a lawn-mower is constructed with two rigid side frames and three cross members triangularly spaced, and parallel with the rotating shafts of the machine, these cross members coupling the side frames together. Preferably the front roller for the machine which is adjustable as to its height is mounted on a rigid cranked shaft, which shaft is rotatable in the side frames and is provided with suitable locking means; such a construction ensures that the said front roller is always maintained in parallelism with the revolving cutter of the machine.

Another feature of the invention consists in the hereinafter-described adjustable mounting for the fixed knife or ledger-blade which co-operates with the rotary cutter of the machine.

Other features of the invention relate to the hereinafter described construction of the front or adjusting roller, the construction of the handle, and the construction of the side-frames.

In the accompanying drawings which illustrate a particular embodiment of this invention, Figure 1 is a perspective view of a complete lawn mower;

Figure 2 is a plan in central section showing the mechanism coupling the driving roller to the rotary cutter;

Figure 3 is a plan with parts broken away, of so much of the machine as is necessary to illustrate the improved mounting for the rotary cutter of the machine;

Figure 4 is a plan showing the mounting of the adjustable front roller of the machine.

Figure 5 is a side elevation of the complete machine, but showing only part of the handle, Figures 6 and 7 show details of construction to a larger scale, Figure 8 is a horizontal section on the line 8—8 of Figure 6 showing in exaggeration the inclination of the different axes.

Like reference characters indicate like parts throughout these figures.

Figure 1:
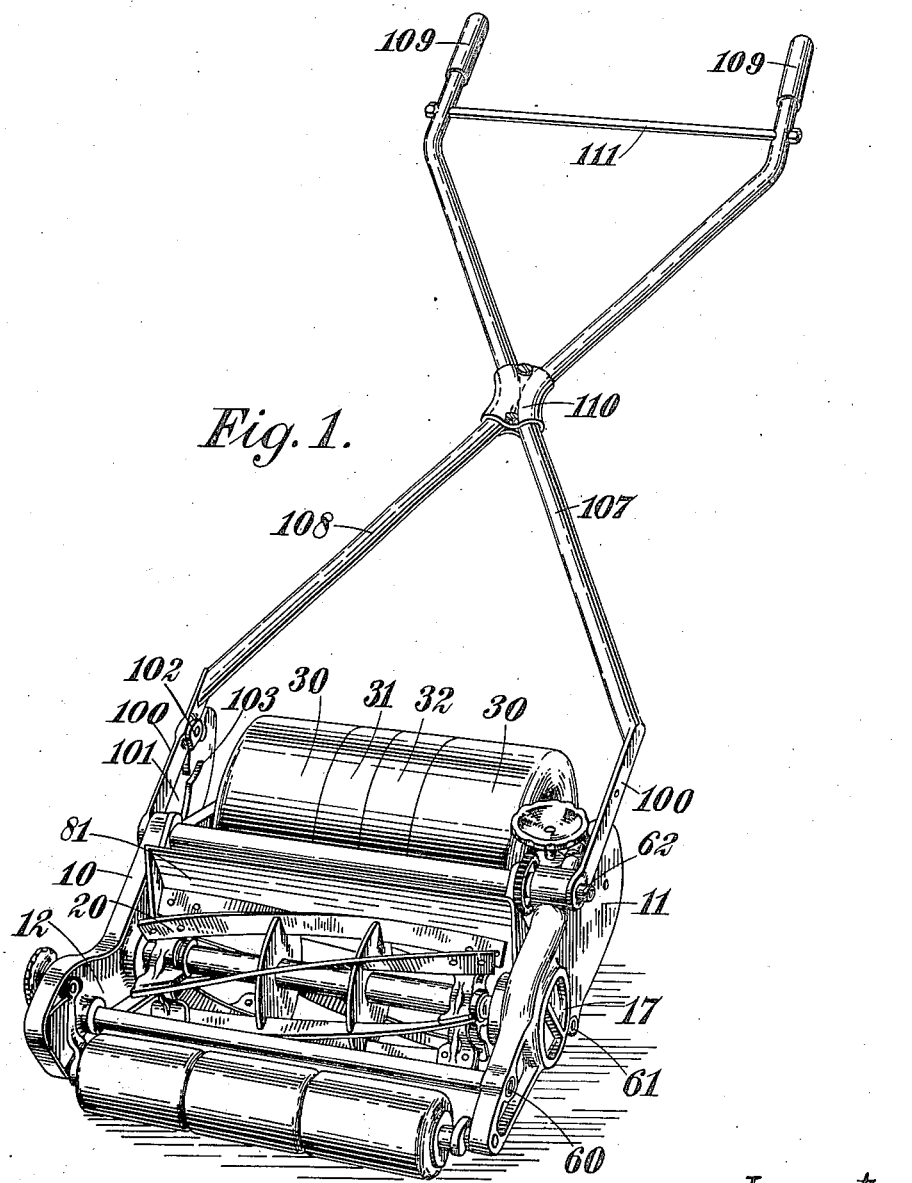

Referring first to Figures 1 and 3, which illustrate the mounting of the rotary cutter between the side frames in such a way that it is readily detachable without disturbing the bearings in the side-frames, the said side-frames are indicated respectively at 10 and 11, and they are provided with suitable coaxial recesses 12, 13, to receive self-aligning bearings 14, 15, which are preferably ball-bearings. Suitable screwed caps 16, 17, are provided to close the outer ends of the chambers 12, 13, to exclude dirt and protect the bearings.

A spindle 18 is mounted in the bearing 14 so as to be rotatable therein, and this spindle extends through the tubular hub 19, which carries the revolving blades 20 of the rotary cutter, and at its other end has threaded upon it a bush or hollow driving member 21. This bush is rotatable in the bearing 15, and the spindle 18 is restrained from longitudinal movement through the bush 21 by a nut 22 which is screwed on to the projecting end of the spindle 18 and seats upon the end or a shoulder, of the bush 21. The spindle 18 is provided, near the bearing 14, with a shoulder or tapered portion 23 which faces the other end of the spindle and engages a similar but internally tapered portion of the hub 19 of the rotary cutter. The other end of the hub 19 is similarly engaged by a tapered portion 24 on the end of the bush 21.

It will be seen that when the nut 22 is tightened up, the shoulders 23, 24 above-mentioned are drawn together and the hub 19 of the cutter is gripped by them and owing to their conical formation the cutter is accurately centred and held coaxial with the spindle 18 and the bush 21, and therefore with the bearings 14, 15.

Should it be desired to remove the rotary cutter, as for example, for grinding the blades 20, all that is necessary is that the caps 16, 17 should be removed, the nut 22 unscrewed from the end of the spindle 18, and the spindle withdrawn through its bearing 14 without removing the bearing from the side frame. The hub of the cutter is thereby freed from the shoulders 23, 24, which support it, and it can be lifted vertically out of the machine, the bearings on which it rotates remaining undisturbed. When therefore the rotary cutter is replaced, there is no difficulty as to its alignment, since its bearings have not been disturbed.

The drive for the rotary cutter is effected in the usual manner by a chain from the driving roller of the lawn-mower, this chain engaging a sprocket wheel 25 which is secured in any convenient manner on the bush 21. The end of the shaft 18 which engages the bush 21 is splined as at 26 or serrated or otherwise so formed as to have a driving rotative engagement with the bush, and the said splines or other formation is continued along the shaft sufficiently far to engage the interior of the hub 19 which is shaped at that end to co-operate with the said splines. The drive of the rotary cutter is therefore transmitted from the sprocket wheel 25 to the bush 21 shaft 18, and thence to the cutter hub 19. This construction of driving engagement between the various parts is such that it does not prevent or render difficult the withdrawal of the shaft 18 when it is desired to remove the rotary cutter or its insertion when the cutter has to be replaced in position.

Another feature of this invention relates to the mechanism whereby the drive is transmitted from the driving rollers of a lawn-mower to the rotary cutter. It is customary when using a chain-transmission gear to effect the necessary multiplication of speed by means of sprocket wheels of different sizes, but there are disadvantages in using small sprocket wheels, and according to this invention the two sprocket wheels are each made as large as can conveniently be accommodated in the side frame of the machine and a separate gearing is used to effect the increase in speed. Conveniently the sprocket-wheels are of about half the diameter of the cylindric cutter, or larger, and the separate gear has a multiplying ratio of at least 4 to 1.

Referring to Figures 1 and 2 of the accompanying drawings, the side frames of the machine are indicated at 10, 11, and there is mounted between them the driving roller. This roller is conveniently made in three parts, the two outer parts 30 being similar in all respects to one another whilst the middle part is made up of two separate cylinders 31, 32 secured together as by the screws 34.

The rotary cutter, of which a portion only is shown, has a hub 19 carrying the blades 20, and is mounted on a shaft 18, the hub being rotatively engaged in any convenient manner with a sprocket wheel 25.

The driving roller is mounted in the side-frames 10, 11 of the machine by a spindle 40 which is fixed in the side-frame 10. This spindle extends only as far as the middle of the driving-roller. The portion 31 of the drum is provided with a sleeve 41 by which it has a bearing on the portion of the spindle 40 which is near the side frame 10 so as to rotate thereon. The companion portion 32 of the driving roller has a similar sleeve 42 which runs in a roller-bearing 43 mounted in the side-frame 11 of the machine. The two outer portions 30 of the driving roller are rotatively mounted as shown in Figure 2 on the respective sleeves 41, 42, so as to rotate thereon.

The mechanism whereby the driving roller 31, 32 transmits a driving effort to the rotary cutter will now be described. The two outer portions 30 of the driving drum are each provided with a pawl-like member 35 (see Figures 2 and 7) mounted in a suitable socket and pressed forward by a spring 36 to engage crown ratchet teeth 37 formed on the central portions of the parts 31, 32 of the driving roller. The pins 38 are fixed in the drums 30 as shown, to limit the forward movement of the pawls 35 and to maintain their correct alignment if they are of cylindrical form, the part engaging the ratchet teeth being cut away to provide the necessary flat surface.

The spindle 40 is so designed as to have a certain amount of torsional resilience and also lateral flexibility, its bearing in 41 being only at the end close up to the frame 10 and the bore of 41 providing clearance elsewhere sufficient to allow the spindle to move laterally under unbalanced couples. The spindle 40 has secured upon it at its inner end an internally-toothed or annular gear-wheel 44, this wheel being situated between the two parts 31, 32 of the driving roller. Upon the part 32 of the roller there are mounted a suitable number of planetary pinions 45 which mesh with the said internally toothed gear 44 and also with a centrally situated pinion or sun-wheel 46. This pinion is secured on a spindle 47 which extends through the sleeve 42 beyond the end thereof, and has mounted upon it at its free end a sprocket wheel 48. Conveniently, the end of the spindle 47 is splined as at 49 to receive a bush 50 which is rotatable in a self-aligning ball-bearing 51 in the frame 11 and the sprocket-wheel 48 is mounted upon the bush 50. A clutch may be interposed between the bush 50 and the sprocket if desired. A chain 52 connects the sprocket-wheel 48 to the sprocket-wheel 25, which as above-mentioned is in driving engagement with the rotary cutter 19, 20.

As previously stated the two sprocket-wheels for the chain-transmission are each made as large as can conveniently be accommodated in the side-frame 11 of the machine, and it is preferred to make this frame as a hollow casing so that the chain and chain-wheels can be entirely enclosed.

When the lawn-mower is traversed along the ground, the driving-roller 30, 31, 32, is rotated thereby. The two parts 30 drive the central part 31, 32, if there is any tendency of the latter to slip, by means of the pawls 35 engaging the ratchet-teeth 37. The central part is thereby rotated carrying the planet pinions 45 round with it. These pinions roll on the fixed annular gear 44 and thereby drive the pinion 46 at a considerably higher speed. This drive is transmitted through the spindle 47 to the sprocket wheel 48 and thence to the other sprocket wheel 25 and rotary cutter.

It will be seen that since the spindle 40 is torsionally resilient and has a certain amount of lateral flexibility, any shocks on the transmission gear due to the rotary cutter encountering obstacles are taken up by the resilience or flexibility of this shaft, and as the lateral flexibility of the spindle ensures an even distribution of the load on the gear teeth of the wheels 44, 45 and 46 on either side of the axis, any damage to the transmission gear is prevented. Further it will be seen that the sprocket wheels are not relied upon for obtaining the considerable multiplication of speed that is necessary; the driving wheel may be made somewhat larger than the driven wheel to secure a hunting tooth if so desired, but in any case both wheels can be made of adequate size; the multiplication of speed, or the main part of it, is obtained by epicyclic gearing which is entirely contained within the driving drum, where it is effectively protected against dirt and can be efficiently lubricated without any waste of lubricant.

Owing to the side parts 30 of the driving roller each having a driving engagement with the central part 31, 32, through a ratchet-and-pawl connection, there will always be a drive transmitted to the cutter at a speed corresponding to the speed of the part 30 which is rotating the more rapidly of the two, as for example, when the machine is traversed in a circle.

Another feature of this invention relates to the construction of the frame of the machine as illustrated in Figures 1, 4 and 5. The two side frames 10, 11 are each in themselves of a suitably rigid construction, and they are connected together by three cross-members 60, 61 and 62 which are triangularly spaced in each of the frames as shown in Figure 5 and are parallel with the rotating shafts of the machine. These cross-members are rigidly secured to each of the side-frames, and preferably they are permanently secured to one of them, as for example by press fits and are rigidly but detachably secured to the other side frame, as for example, by the use of cotter pins or other suitable device. The cross members themselves are conveniently constituted by steel tubes fitting in suitable bores in the side-frame.

Such a construction of frame for a lawn mower is light and to a very considerable extent it is suitably rigid; should any distortion occur, however, the construction is such that the side-frames maintain their parallelism so that the various rotating shafts and the ledger blades co-operating with the rotary cutter also maintain their parallel relationship so that the cutting capabilities of the machine are not impaired. In order to provide for such distortion it is preferred to mount all the rotating shafts of the machine in self-aligning bearings. Ordinary swivel bearings could be used but it is preferred to use self-aligning ball-bearings.

According to another feature of this invention, the front roller of the machine (which is used to regulate the height of the ledger-blade co-operating with the rotary cutter, above the ground,) is constructed in such a manner that it is always maintained in parallelism with the cutter.

Referring to Figures 4 and 5, the front roller 70 which is conveniently made in sections, is rotatable upon an axle 71, and this axle is formed with cranked ends 72, one of which is detachable from the axle and each of which carries a stub shaft 73 mounted in coaxial bores in the side-frames 10, 11 of the machine. Adjustment of height of the front roller 70 is made by rotating its cranked axle in the said side frames and since the axle has the two cranks rigidly secured on it the axis of the roller is always maintained parallel with the axis about which it turns and this latter axis is parallel with the revolving shafts of the machine.

The manual adjustment of the roller is effected by means of an arm 74 which is formed integrally with or otherwise suitably secured to the crank 75 on the spindle 71. At its upper end this arm 74 carries a pin 76 entering an arcuate slot 77 in the side-frame 10 of the machine, and a hand-wheel 78 on the pin 76 enables it to be clamped in any desired position in the slot 77. The height of the front roller 70 is therefore very easily varied by simply slackening the hand-wheel 78 and swinging the roller 70 into the desired position of adjustment and then reclamping the hand-wheel, the parallelism of this roller with the other shafts being ensured in all positions.

The shaping of the side frame 10 to provide for the slot 77 offers another advantage in that it provides a toe or abutment 79 as shown in Figure 5, and this is used to render the machine self-supporting in an upright position. The handle of the machine is arranged to swing down and be locked in line with the side frames (as hereinafter described) and the whole machine is tilted up about its front roller 70 until the abutment 79 engages the ground. The machine will then stand without further support and it will be appreciated that this is very convenient for storage since the minimum amount of floor space is occupied and the rotary cutter and the fixed knife are supported well away from the ground so that there is less liability of their being affected by dampness.

The construction and arrangement of the handle is illustrated in Figures 1, 2 and 5, and constitutes another feature of this invention.

Referring to Figure 5 the handle, a portion of which is indicated at 100, is pivotally engaged with the side frames of the machine, conveniently being mounted on the ends of the cross-member 62 aforesaid and secured thereto by a split pin or other suitable device. On the handle 100 there is pivoted at 102 a catch 101 which is constituted by a flat plate provided with two notches 103, 104 respectively. This plate also has a toe 105 extending below the lower notch 104. A pin 106 projecting from the side frame 10, conveniently coaxial with the driving rollers is provided to engage with one or other of the notches 103, 104. The plate 101 is preferably so shaped that it is actuated by gravity to bring one or other of its notches 103, 104 automatically into engagement with the pin 106 when the handle is placed in either its raised position, as shown in Figure 5 or its lowered position in which it is in line with the longitudinal axis of the side frames. The toe 105 extends under the pin 106 and prevents the handle and plate 101 being lifted too high to engage the lower notch. It will be seen from Figures 1 and 2 that the plate 101 does not lie entirely in one plane, but a portion of it is slightly offset to permit of its pivotal mounting on the inner side of the handle 100 without increasing the width of the machine.

The construction of the handle itself constitutes another feature of this invention, and as is shown most clearly in Figure 1 the handle is constituted by two tubular members 107, 108 respectively which are formed at one end (as shown at 100) for pivoting on the machine, and are provided with gripping portions 109 at the other end. The two tubular members 107, 108 are each bent to an obtuse V-shape and they are set each with its apex facing the apex of the other one and close thereto. A clamping device 110 which may be constituted by a pair of plates or any other suitable construction secures the two handles together at their apexes. The whole constitutes a handle which is X-shaped and the two free ends are secured together by a tie-rod 111. This provides a light but strong and rigid construction of handle, and the locking catch 101 enables it to be used in the manner above-described for standing the machine upright.

Another feature of this invention relates to the mounting of the fixed knife or ledger blade which cooperates with the rotary cylindric cutter, and reference is directed to Figures 1, 3 and 5 as illustrating a preferred construction.

The knife 80, as shown in Figure 5 is mounted upon a carrier 81, conveniently of plate-like form extending partly around the rotary cutter to serve as a guide for the grass which has been severed. The knife 80 is mounted on the lower end of this carrier in proximity to the ground and rotary cutter in the usual manner, but it is preferably a reversible knife having two cutting edges 82, 83, either of which may be brought into the operative position. It is secured to the carrier 80 in any convenient manner as by screws 84, the only requisite being that the screws are symmetrical about the longitudinal axis of the knife in order that its reversibility can be ensured.

The knife-carrier 81 is provided with three lugs 85 which are bored longitudinally of the carrier but slightly aslant in the horizontal plane to receive a long parallel-sided sleeve 86, and this sleeve is bored equally aslant in the reverse direction, with the result that when the axis of its bore lies truly across the machine parallel with the ledger blade it intersects the slightly aslant longitudinal axis of the sleeve 86 at about the middle of its length. The central one of the lugs 85 is provided with means for locking this sleeve to the carrier 81 in any desired position of adjustment. The preferred locking means comprises a cotter pin 120, reduced for a portion of its length and having thereon a short sleeve 121. A cylindrical gap is formed on adjacent portions of the head and short sleeve to fit the outside of the sleeve 86, and the locking is effected by a nut 122 which presses the sleeve 121 towards the head 120. The carrier 81 and sleeve 86 can be rotated together upon the tube 61, and by unlocking it the sleeve 86 can be rotated within the carrier and upon the cross-member 61 of the frame so as to tilt the ledger blade up at either end and down at the other to truly register with the cylindric cutter.

The carrier 81 is provided on its rear face, that is to say, the face away from the rotary cutter, with lugs 87 at either side, which carry cotter pins 91. One of the tubular cross-members 62 of the frame of the machine has mounted upon it a sleeve 88 which has integral with it at each end an eccentric 89, (see Figure 5) upon which is a sheave 90 engaging one of the pins 91 in a lug 87 aforesaid, so that rotation of the tube 88 upon the cross frame member 62 swings the carrier 81 on the cross member 61 and moves the ledger-blade towards or away from the cylindric cutter. The said rotation of the tube 88 and eccentrics is effected by a manually operated worm engaging a worm-wheel 92 integral with the tube 88, the worm itself being turned by means of a hand-wheel 93. Since the cross-member 61 is accurately parallel with the axis of the rotary cutter this movement of the knife blade does not affect its parallelism with the axis of the rotary cutter but merely gives the desired close setting of the knife to the cutter.

It will be seen that a machine constructed in the manner hereinbefore described is one that will be of greater mechanical efficiency than lawn-mowers as hereinbefore constructed, and it will be reliable in use and easily adjusted when required. Moreover the adjustments are of a simple nature such as can be undertaken by unskilled persons. Finally, the machine is very compact and can be stored in a minimum of space.

What I claim as my invention and desire to secure by Letters Patent is:—

1. In a lawn-mower the combination of two frame members, a bearing in one of them, a hollow driving-member rotatable in said bearings, a shaft mounted at one end within said driving member and extending therefrom to the other frame-member, a cutting reel supported at one end by and rotatively engaged with said driving-member, and supported at the other end by said shaft, a bearing in said other frame-member for the other end of said shaft, said bearing having an opening to permit endwise withdrawal of the shaft through it from within the cutting reel and driving member.

2. In a lawn-mower the combination of two frame-members, a bearing in one of them, a hollow driving-member rotatable in said bearing, a shaft mounted at one end within said driving member, a cutting reel supported at one end by said driving-member and at the other end by said shaft, means for rotatively locking said shaft to the driving-member and cutting reel, a bearing in said other frame-member for the other end of said shaft, said bearing having an opening to permit endwise withdrawal of the shaft through it from within the cutting reel and driving-member.

3. In a lawn mower, the combination of a rotary cutting reel having a hollow hub, a rotatably mounted spindle extending through said hollow hub, a bearing at one end of said spindle, a shoulder on said spindle adjacent to said bearing and facing the other end of said spindle, said shoulder engaging one end of the hub of said cutter, a bush coaxial with said spindle and surrounding its free end, a nut screwed on the end of said spindle and engaging the end of said bush which is remote from the bearing for said spindle, a bearing wherein said bush is rotatable, a seating on the end of said bush facing the shoulder on said spindle and engaging the other end of the hub of said cutter, a sprocket wheel fast on said bush, driving means for rotating said wheel, and a driving connection between said bush and the hub of said cutter.

4. In a hand-driven lawn mower the combination of a rotary cutting reel, a gear in driving engagement therewith and of a diameter equal to one-half the diameter of said cutting reel, a second gear operatively connected to the said first gear and of a diameter substantially equal to the diameter of the said first gear, a driving roller, and a separate multiplying gear coupling said second gear and roller to provide a drive from the roller to the gear.

5. In a lawn mower the combination of a driving roller, a sprocket wheel, an epicyclic multiplying gear coupling said driving roller to said sprocket wheel, a rotary cutting reel, a second sprocket wheel operatively connected to said cutting reel and a chain connecting the two sprocket wheels.

6. In a lawn mower, the combination of a driving roller divided into a plurality of parts, a ratchet and pawl connection between one part and the other part or parts, a sprocket wheel, an epicyclic train of gearing coupling the said first mentioned part of said driving roller to said sprocket wheel, a rotary cutter, a second sprocket wheel operatively connected thereto, and a chain connecting the two sprocket wheels.

7. In a lawn mower, the combination of a driving roller divided into a plurality of parts, a ratchet and pawl connection between one part and the other part or parts, a sprocket wheel, a laterally flexible shaft extending coaxially into said driving roller, an epicyclic train of gearing whereof one sun-wheel is non-rotatably mounted on said shaft, said train coupling the first mentioned part of said driving roller to said sprocket wheel, a rotary cutter, a second sprocket wheel operatively connected thereto, and a chain connecting the two sprocket wheels.

8. In a lawn mower, the combination of a driving roller divided into a plurality of parts, a ratchet and pawl connection between one part and the other part or parts, a sprocket wheel, a laterally flexible and torsionally resilient shaft extending coaxially into said driving roller, an epicylic train of gearing whereof one sun-wheel is non-rotatably mounted on said shaft, said train coupling the first mentioned part of said driving roller to said sprocket wheel, a rotary cutter, a second sprocket wheel operatively connected thereto, and a chain connecting the two sprocket wheels.

9. In a lawn mower the combination of side frames, cross members connecting the side frames together, a rotary cutting reel, a sleeve rotatably mounted on one of the said cross members and having the axis of its internal bore inclined to the axis of its external surface, a fixed knife rotatably adjustable on the outer surface of said sleeve and co-operating with said rotary cutting reel and means for rocking said knife on said sleeve and for rocking said sleeve on said cross member.

10. In a lawn mower, the combination of side frames, cross members connecting the side frames together, a rotary cutter, a sleeve whereof the axis of the internal bore is inclined to the axis of the external surface, mounted on one of said cross members and rotatable thereon, a fixed knife rotatably adjustable on said sleeve cooperating with said rotary cutter, a second sleeve rotatable on another of said cross members, an eccentric at each end of said second sleeve, a sheave on each of said eccentrics coupled to said fixed knife, and a manually adjustable worm gear for rotating said second sleeve.

11. In a lawn mower, the combination of side frames, a cross member connecting said frames together, a parallel sided sleeve having a bore that is neither parallel nor coaxial with the longitudinal axis of the sleeve, mounted on to said cross-member, so as to be rotatable thereon, and a carrier rotatably adjustable on the outer surface of said sleeve, a ledger blade on said carrier, and a rotary cutting reel cooperating with said ledger blade.

12. In a lawn mower, the combination of side frames, cross members rigidly connecting them together a rotary cutting reel, a fixed knife cooperating therewith, a rigid cranked shaft having its cranked portions coaxial and mounted by said cranked portions at the front end of said side frames, a roller on said shaft, means for rotating said cranked shaft in said side frames and for locking it when thus adjusted.

13. In a lawn-mower, the combination of side frames, and cross members rigidly connecting them together, one of said side frames having formed on it a toe portion extending laterally to the length of the frame at the end remote from the driving roller, substantially as described.

14. In a lawn mower, the combination of side frames and cross members rigidly connecting them together, one of said side frames having formed on it a flattened portion, approximately at right angles to the length of the frame, at the end remote from the driving roller and a handle pivotally mounted on said side frames so as to be movable from the normal working position approximately into alignment with the said side frames.

15. In a lawn mower, the combination of side frames, cross members rigidly connecting them together, a handle pivotally mounted in said side frame, to a pin projecting from one of said side frames, a plate pivotally mounted on said handle and formed with two notches to engage said pin, and also formed with a projecting toe adjacent one of said notches, substantially as described.

In testimony whereof I affix my signature.

ARTHUR ERNEST JERRAM.